United States Patent
Watanabe et al.

(10) Patent No.: US 8,741,252 B2
(45) Date of Patent: Jun. 3, 2014

(54) PROCESS FOR PRODUCING POROUS OBJECT AND APPARATUS THEREFOR

(75) Inventors: Katsumi Watanabe, Takasago (JP); Masahiro Yamagata, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 651 days.

(21) Appl. No.: 11/547,472

(22) PCT Filed: Apr. 25, 2005

(86) PCT No.: PCT/JP2005/007786
§ 371 (c)(1),
(2), (4) Date: Oct. 5, 2006

(87) PCT Pub. No.: WO2005/105671
PCT Pub. Date: Nov. 10, 2005

(65) Prior Publication Data
US 2007/0272126 A1    Nov. 29, 2007

(30) Foreign Application Priority Data

Apr. 28, 2004   (JP) ................................ 2004-133823

(51) Int. Cl.
*C01B 33/12* (2006.01)
*H01M 8/06* (2006.01)

(52) U.S. Cl.
USPC .......................................... 423/338; 423/335

(58) Field of Classification Search
None
See application file for complete search history.

(56) References Cited

U.S. PATENT DOCUMENTS

| 4,610,863 | A  |   | 9/1986  | Tewari et al.              |
|-----------|----|---|---------|----------------------------|
| 5,360,320 | A  | * | 11/1994 | Jameson et al. ...... 417/4 |
| 5,744,510 | A  | * | 4/1998  | Pekala ............. 521/181 |
| 5,830,387 | A  |   | 11/1998 | Yokogawa et al.            |
| 6,514,438 | B1 | * | 2/2003  | Ayyagari et al. ..... 264/2.6|
| 6,531,224 | B1 | * | 3/2003  | Fryxell et al. ...... 428/405 |
| 6,670,402 | B1 | * | 12/2003 | Lee et al. .......... 516/111 |
| 2006/0124783 | A1 | * | 6/2006 | O'Connor et al. ..... 241/1 |

FOREIGN PATENT DOCUMENTS

| JP | 10 231116   |   | 9/1998 |
|----|-------------|---|--------|
| JP | 2001-072408 | * | 8/1999 |
| JP | 3 048 276   |   | 3/2000 |
| JP | 2001 072408 |   | 3/2001 |
| JP | 2001 089129 |   | 4/2001 |
| JP | 2001 158615 |   | 6/2001 |

OTHER PUBLICATIONS

Jeffery Kahn, Aerogel Research at LBL: From the Lab to the Marketplace, Berkeley Lab Science Articles Archive (1991) at www.lbl.gov/Science-Articles/Archive/aerogel-insulation.html (last visited Mar. 5, 2009).*
English translation of JP 2001-072408.*
Subramanian, ed., Process Scale Liquid Chromatography, 166 VCH (1995).*
Droege, Aer()sculpture Material Preparation and Processing, Sol-gel Gateway (2002).*
Supplementary European Search Report issued Jun. 27, 2011, in Patent Application No. 05734059.8.

* cited by examiner

*Primary Examiner* — Yoshitoshi Takeuchi
(74) *Attorney, Agent, or Firm* — Oblon, Spivak, McClelland, Maier & Neustadt, L.L.P.

(57) ABSTRACT

Disclosed is a process for producing porous materials by replacing a first solvent in a wet material containing the first solvent with a second solvent in a high pressure condition and drying the resulting wet material which process comprises a mixed solvent feeding step for feeding a mixed solvent composed of a solvent identical to or of the same kind as the first solvent and the second solvent to the wet material.

14 Claims, 5 Drawing Sheets

PROCESS FOR PRODUCING POROUS OBJECT AND APPARATUS THEREFOR

TECHNICAL FIELD

This invention relates to a process for producing porous materials such as aerogels and to an apparatus therefor. More particularly, it relates to a process by which porous materials can be produced while preventing porous materials from undergoing cracking and so forth in the step of drying, in particular, and to an apparatus useful for such a process.

BACKGROUND ART

Among optically transparent or semitransparent inorganic porous materials, there are known aerogels obtainable, for example by subjecting an alkoxysilane to hydrolysis and polycondensation and then drying the thus-formed gel-like compound (wet gel) by eliminating the solvent used in forming that gel-like compound. These aerogels are light and have good heat insulating properties and, therefore, have attracted attention as useful heat insulating materials in various fields.

In producing such aerogels, it is necessary to efficiently remove the solvent used in forming the above-mentioned gel-like compound (wet gel) from the gel-like compound to give a dry gel. However, if such a wet gel is dried as it is, the structure of the gel-like compound will be destroyed and the gel cannot be dried with the shape thereof being retained. This is considered to be due to the stress caused by the surface tension generated at the gas-liquid interface, among others.

As means for preventing such a structure destruction, a method is known as typical one which comprises drying in a supercritical condition (e.g. Non-Patent Document 1). Such a method is based on the principle that when the atmosphere is in a supercritical condition, there is no distinction between gas and liquid any longer, hence, theoretically, the surface tension generation at the gas-liquid interface can never happen.

As another technology utilizing such a principle, the technology described in Patent Document 1, for instance, has also been proposed. This technology teaches a method which comprises drying a gel-like compound while replacing the solvent (e.g. alcohol) contained in that compound with supercritical carbon dioxide. According to this method, a supercritical condition can be realized relatively easily and inexpensively since the critical temperature and critical pressure of carbon dioxide are relatively low.

However, a problem still remains. Namely, when the replacement of the gel-surrounding solvent as attainable by feeding carbon dioxide in a supercritical condition occurs at an excessively high rate, the stress increases and causes cracking of the aerogel as a result of interfacial tension generation, among others, within the wet gel due to rapid changes in concentration within the gel and so forth and as a result of diffusion and expansion of the solvent. Accordingly, for example, a measure is taken so that carbon dioxide in a supercritical condition may be fed over a long period of time.

On the other hand, from the cracking prevention viewpoint, such a technology as disclosed in Patent Document 2 has also been proposed. This technology consists in maintaining the high pressure vessel inside after solvent replacement at a temperature not lower than the boiling point of the solvent to prevent the solvent remaining in the atmosphere from liquefying and thereby prevent the solvent from generating a gas-liquid interface, thus preventing the gel-like compound structure from being destroyed. However, even when such a measure is taken, it cannot be said that the operation efficiency be much improved; and, when the rate of replacement is excessively high, the problem of cracking still remains.

Non-Patent Document 1: "Sol-Gel Ho no Kagaku (Science of Sol-Gel Method)", published May 1, 1990 by Agne Shofusha, page 37
Patent Document 1: U.S. Pat. No. 4,610,863
Patent Document 2: Japanese Patent No. 3,048,276

DISCLOSURE OF INVENTION

The present invention has been made under such circumstances, and it is an object of the present invention to provide a process for producing porous materials efficiently while preventing crack formation in or destruction of the porous material in the step of drying as well as a production apparatus useful for carrying out such a process.

The present invention, which has successfully accomplished the above object, provides a process for producing porous materials by replacing a first solvent in a wet material containing the first solvent with a second solvent in a high pressure condition and then drying the wet material, the gist of the process consisting in its comprising a mixed solvent feeding step in which a mixed solvent composed of a solvent identical to or of the same kind as the first solvent and the second solvent is fed to the wet material.

In the mixed solvent feeding step in this process, the mixing percentage or content of the second solvent in the mixed solvent is preferably increased with the lapse of time during feeding. Further, the very rate of increase in the mixing percentage of the second solvent is also preferably increased with the lapse of time during feeding. In the mixed solvent feeding step, the pressure of the mixed solvent is also preferably reduced with the lapse of time during feeding. As the porous materials which are the targets of the process of the present invention, there may be mentioned aerogels as typical examples. Further, as for the solvents to be used, an alcohol as the first solvent and carbon dioxide as the second solvent are preferably combined.

On the other hand, the production apparatus of the present invention, which has successfully accomplished the above object, is an apparatus for producing porous materials by replacing a first solvent in a wet material containing the first solvent with a second solvent in a high pressure condition and then drying the wet material, the gist of the apparatus consisting in its comprising: a high pressure first solvent feeder for feeding a solvent identical to or of the same kind as the first solvent in a high pressure condition; a high pressure second solvent feeder for feeding the second solvent in a high pressure condition; a high pressure mixing section for mixing the solvent identical to or of the same kind as the first solvent with the second solvent in a high pressure condition; and a porous material treatment section for contacting the mixed solvent fed from the high pressure mixing section with the wet material within the treatment section.

Preferably, this apparatus further comprises a feed ratio controlling system for controlling the ratio between the feed of the solvent identical to or of the same kind as the first solvent and the feed of the second solvent. Also preferably, this apparatus may comprise a first solvent separation section for separating the solvent identical to or of the same kind as the first solvent from the solvent discharged from the porous material treatment section. Further, the apparatus may also preferably comprise a first solvent reservoir for storing the solvent identical to or of the same kind as the first solvent as separated in the first solvent separation section and a first solvent circulation section for circulating the solvent identical to or of the same kind as the first solvent from the first solvent reservoir to the high pressure first solvent feeder for reuse thereof, as described later herein. Preferably, the apparatus further comprises a decompression section provided on the outlet side of the porous material treatment section, a pressure detector for detecting the pressure of the mixed solvent fed to the porous material treatment section, and a decompression controller for controlling the decompression section based on the signal detected by the pressure detector to thereby control the pressure of the solvent discharged from the porous material treatment section.

As another configuration of the production apparatus of the present invention, there may be mentioned an apparatus for producing porous materials by replacing a first solvent in a wet material containing the first solvent with a second solvent in a high pressure condition and then drying the wet material, which apparatus comprises: a porous material treatment section for replacing the wet material containing the first solvent with the second solvent in the treatment section and drying the wet material; a solvent circulation section for circulating and reusing at least a part of the solvent discharged from the porous material treatment section; a high pressure second solvent feeder for feeding the second solvent in a high pressure condition; and a high pressure mixing section for mixing the solvent from the solvent circulation section with the second solvent from the high pressure second solvent feeder and then feeding the mixed solvent to the porous material treatment section. An apparatus having such a configuration can also accomplish the above-mentioned object of the present invention.

Preferably, this apparatus further comprises a second solvent feed controlling system for controlling the mixing percentage of the second solvent in the mixed solvent to be fed to the porous material treatment section by controlling the rate of feeding of the second solvent from the second solvent feeder. Further, the above apparatus may preferably comprise a first solvent separation section for separating the first solvent from at least a part of the solvent discharged from the porous material treatment section. Further, the apparatus may preferably comprise a first solvent reservoir for storing the first solvent separated in the first solvent separation section and a first solvent circulation section for circulating and reusing the first solvent from the first solvent reservoir to and in the porous material treatment section. Preferably, the apparatus further comprises a decompression section provided on the outlet side of the porous material treatment section, a pressure detector for detecting the pressure of the mixed solvent fed to the porous material treatment section, and a decompression controller for controlling the decompression section based on the signal detected by the pressure detector to thereby control the pressure of the solvent discharged from the porous material treatment section.

In producing porous materials by solvent replacement in and drying of the wet material (wet gel) in accordance with the present invention, a mixed solvent composed of a solvent identical to or of the same kind as the solvent contained in the wet material and a replacing solvent is fed in lieu of feeding the replacing solvent alone, so that the stress generation within the wet gel as caused by the formation of a binary phase (liquid/liquid or gas/liquid) interface between both the solvents and/or an excessively high rate of replacement can be alleviated and, therefore, porous materials can be produced efficiently while avoiding cracking and preventing the gel-like compound structure from being destroyed.

BEST MODES FOR CARRYING OUT THE INVENTION

The present inventors made investigations from various angles in order to accomplish the above object. As a result, they found that when, in producing a porous material by solvent replacement and drying of the resulting wet material (wet gel), a mixed solvent resulting from admixture of a solvent identical to or of the same kind as the solvent contained in the wet material is fed, the above object can successfully be accomplished. Thus, they have now completed the present invention. The phrase "solvent of the same kind" as used herein means a solvent at least partly miscible or compatible with the solvent contained in the wet material, and the combination of solvents of the same kind includes, for example, an alcohol and water, and ethanol and methanol. The "circulating and reusing", so referred to herein, includes not only the case of circulation of the whole amount but also the case of circulation of a part alone.

Feeding of the replacing solvent alone at a pressure higher than atmospheric pressure in the step of drying results in the formation of a binary phase interface between the solvent contained in the wet material and the replacing solvent and/or an excessively high rate of replacement, whereby a stress is caused in the wet gel. On the contrary, when the replacing solvent is fed in the form of such a mixed solvent as mentioned above in the mixed solvent feeding step, the concentration difference between the solvent within the porous material and the solvent fed from the outside can be controlled in an arbitrary manner and, accordingly, the stress loaded on the wet material can be reduced as far as possible.

The effects of the present invention can be produced if only the replacing solvent is fed in the form of such a mixed solvent as mentioned above. Preferably, however, the mixing ratio between the solvents in the mixed solvent is varied in the mixed solvent feeding step so as to increase the mixing percentage of the second solvent (replacing solvent) with the lapse of time during feeding. The phrase "increase the mixing percentage of the second solvent with the lapse of time during feeding" as used herein means the manner of feeding of the second solvent so that the mixing percentage or content thereof may increase with the progress of the process of feeding the mixed solvent. The manner of such feeding is not limited to the feeding of the mixed solvent in a manner such that the mixing percentage of the second solvent increases continuously and smoothly; thus, the manner of mixed solvent feeding may also be such that the mixing percentage in question increases stepwise. By employing such a configuration, it becomes possible to attain rapid solvent replacement while narrowing down the concentration difference between the inside and outside of the porous material.

The porous materials which are the targets of the present invention include not only silica aerogels but also metal oxide aerogels/porous metal oxides (e.g. $TiO_2$, $Al_2O_3$, MgO, $SiO_2$—$TiO_2$, $SiO_2$—$Al_2O_3$, Pd—$AlO_2O_3$, Ni—$SiO_2$, zeolite, $BaAl_{12}O_{19}$, $TiCl_4$—$Al_2O_3$ and the like for use as single oxide catalysts, double oxide catalysts, catalyst supports, etc.), polymer aerogels (e.g. resorcinol-formaldehyde resins, Cu-containing copolymers, etc.), such porous materials as porous intercalated clay minerals, or fragile substances susceptible to breaking by a capillary force upon drying in the conventional manner (e.g. dried humic acid, a kind of biopolymer, etc.) and substances readily undergoing aggregation (e.g. Y—Ba—Cu—O type double oxide fine powders etc.), among others. With such porous materials as well, the same problems arise in the step of drying and such problems can be cleared up by applying the present invention.

In the practice of the present invention, the first solvent contained in the wet material (e.g. wet gel) corresponds to the solvent used in the production of the porous wet gel and, generally, an alcohol is used in many instances. The alcohol is not particularly restricted but any of methanol, ethanol, isopropanol, butanol and so forth can be used.

Herein, this first solvent is estimated to be an alcohol contained at the stage of aerogel production, for instance. However, it may be another solvent at the stage after displacement of the alcohol contained at the stage of aerogel production once with that other solvent and after removal of the catalyst and so forth contained at the production stage, or a solvent at the stage after subjecting the aerogel to treatment for rendering the same hydrophobic or, further, a solvent highly soluble in critical carbon dioxide at the stage after replacement therewith, for example such an organic solvent as acetone or hexane.

On the other hand, the second solvent to be used for displacing the first solvent in the practice of the present invention is not particularly restricted but may be any of those capable of readily attaining a high pressure condition (in particular, a supercritical condition), including, for example, carbon dioxide, nitrous oxide, propane and ammonia. Among these, carbon dioxide is recommended from the viewpoint that it is relatively low in critical temperature and critical pressure and is a safe and inexpensive fluid. In particular, carbon dioxide is advantageous in that the treatment can be carried out inexpensively as compared with the case of using an alcohol in a supercritical condition.

The feeding of the second solvent may be carried out under any conditions sufficient for the first solvent and second solvent to be in an at least critical state of a binary system without forming a two-phase state (state in which liquid/liquid or gas/liquid two phases coexist). Thus, it is not essential that the feeding be carried out under conditions such that the first solvent or second solvent is in an at least critical state. It is not essential, either, that the feeding be carried out under conditions such that the first solvent at the stage after admixture is in an at least critical state of the first solvent or in an at least critical state of the second solvent. For efficient gel inside displacement, however, it is more preferable that the second solvent be at a pressure and temperature sufficient to bring about an at least critical state. The phrase "at least critical state" as used herein includes, within the meaning thereof, "supercritical state, critical state or subcritical state".

Figure 5:
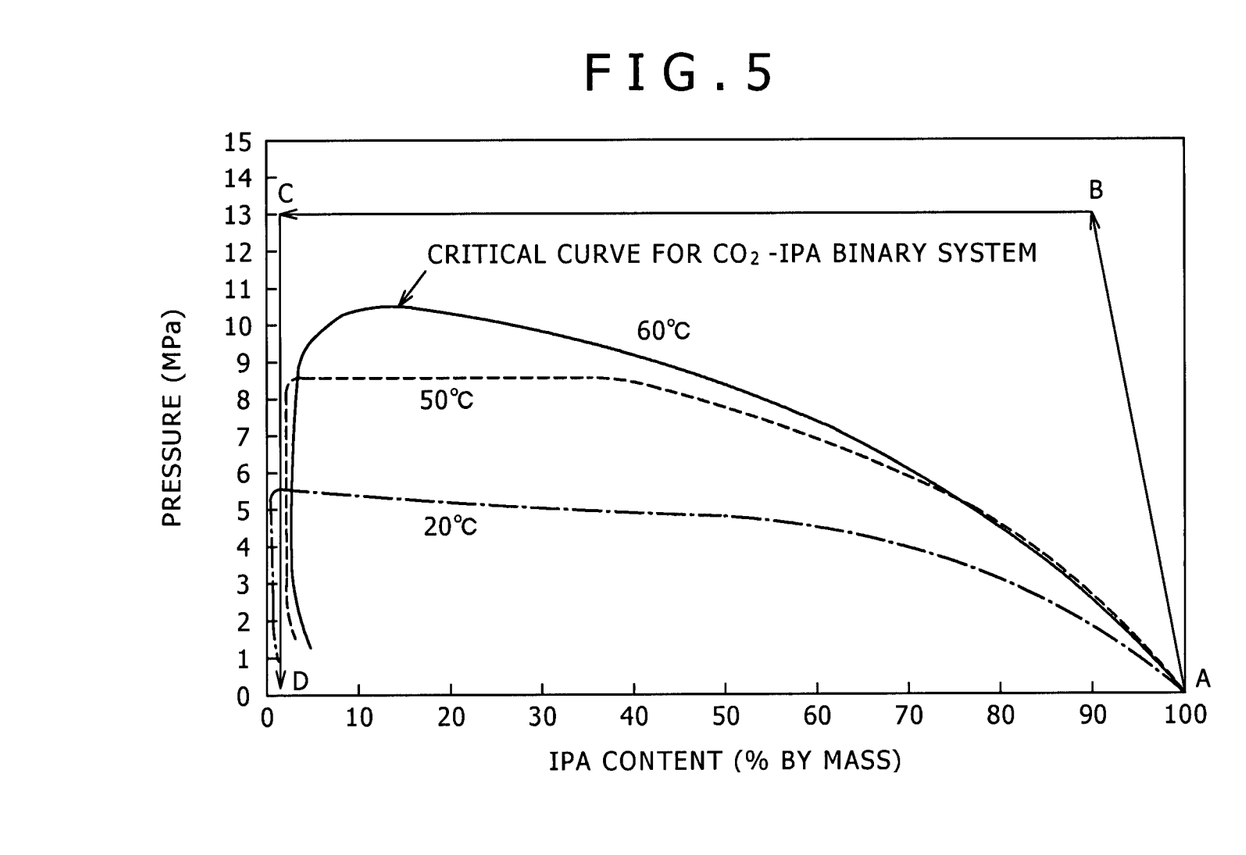
FIG. 5 is a phase equilibrium diagram for isopropanol employed as the first solvent and carbon dioxide employed as the second solvent.

The case where isopropanol (IPA) is used as the first solvent and carbon dioxide as the second solvent, for instance, is now described referring to FIG. 5 showing phase equilibriums at 60° C., 50° C. and 20° C. As understandable from FIG. 5, a state of coexistence of two phases at 60° C. is found at 10.5 MPa or below and, therefore, when the temperature is 60° C., a pressure of not lower than 10.5 MPa is sufficient. The critical temperature of IPA is 235° C. and, therefore, 60° C. is below that critical temperature; in spite of that fact, it is possible to effect the displacement and drying without passing though a state of coexistence of two phases. When the treatment is carried out at a temperature not higher than the critical temperature of carbon dioxide, namely 31° C., for example at 25° C., a treatment for raising the temperature, for instance, may be carried out, for effecting solvent displacement, before arrival at a state of coexistence of two phases.

From such a viewpoint, the mixed solvent to be used in the practice of the present invention is preferably the combination of an alcohol as the first solvent and carbon dioxide in a supercritical state as the second solvent.

Figure 1:
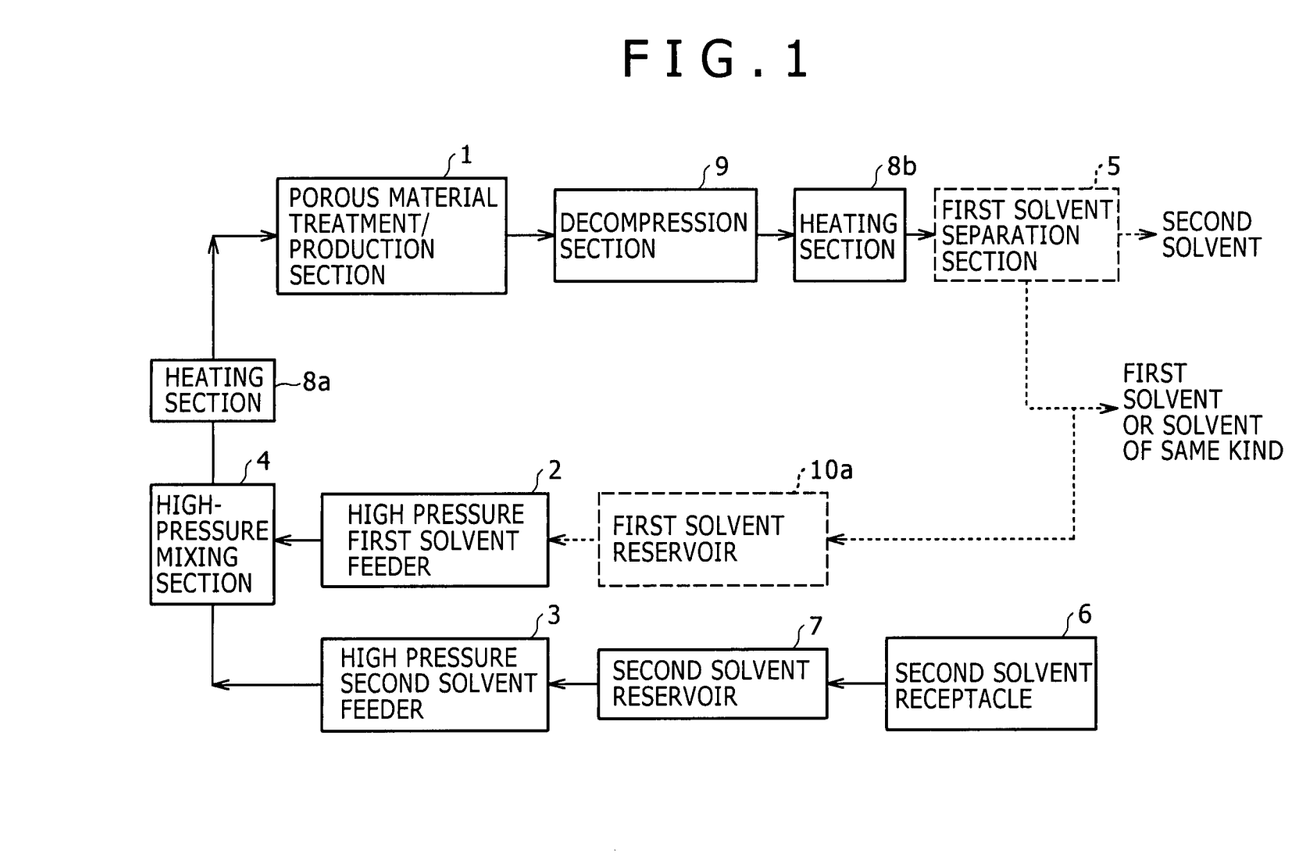
FIG. 1 is an explanatory drawing illustrating, by way of example, a configuration of the production apparatus according to the present invention.

Now, the configuration of the apparatus of the present invention is described in detail, referring to the drawings. FIG. 1 is an explanatory drawing illustrating an example of the configuration of the production apparatus of the present invention. This apparatus includes, as fundamental constituent elements, a porous material treatment section 1, a high pressure first solvent feeder 2, a high pressure second solvent feeder 3 and a high pressure mixing section 4. These fundamental constituent elements are accompanied by a second solvent receptacle 6, a cooling section 7, heating sections 8a and 8b, and a decompression section 9 and, if necessary, a first solvent separation section 5 and/or a feed ratio controlling system (not shown) is provided. If necessary, a first solvent reservoir 10a and/or a first solvent circulating system (not shown) is further provided. In some instances, the heating section 8a and heating section 8b are disposed at sites different from those shown in FIG. 1 (e.g. in front of the high pressure mixing section 4 or in front of the decompression section 9) according to the first solvent and second solvent species to be handled and to the conditions, among others. In some cases, these are not disposed at any sites in FIG. 1.

In such an apparatus, a liquid solvent (first liquid solvent) contained in the wet material (e.g. wet gel) to be treated in the porous material treatment section 1 or a liquid solvent of the same kind as that solvent is fed to the high pressure first solvent feeder 2, and this liquid solvent is fed, in a high pressure condition, from the high pressure first solvent feeder 2 to the high pressure mixing section 4. A second solvent for displacement is fed to the high pressure second solvent feeder 3, and this solvent is fed, in a high pressure condition, from the high pressure second solvent feeder 3 to the high pressure mixing section 4. The second solvent in a low pressure condition is fed from the second solvent receptacle 6 to the high pressure second solvent feeder 3 via the cooling section 7. Although not shown in FIG. 1, the second solvent discharged from the first solvent separation section 5 may be returned to the second solvent receptacle 6 via a heat exchanger or a refiner, for instance, for the reuse thereof.

If necessary, this apparatus is provided with a feed ratio controlling section. In the high pressure mixing section 4, the respective solvents (first solvent or solvent of the same kind and second solvent) fed in a predetermined ratio through the feed ratio controlling section are mixed up to give a mixed solvent. And, this mixed solvent is heated in the heating section 8a and then sent to the porous material treatment section 1. The temperature for this heating is set to not less than the temperature at which the mixed solvent occurs in a state of coexistence of two phases. The feed ratio controlling section may be disposed on the inlet side of the high pressure mixing section 4 or on the inlet side or outlet side of each of the high pressure first solvent feeder 2 and high pressure second solvent feeder 3. It is not necessary, however, to dispose the feed ratio controlling section at one of those locations. It is only necessary that it be located at least at a site making it possible to vary the mixing percentage of each solvent.

A wet material (e.g. wet gel) containing the first liquid solvent is placed in the porous material treatment section 1, and this wet material comes into contact with the mixed solvent fed thereto, and the first solvent in the wet material is gradually (with the lapse of time during feeding) replaced with the second solvent in the mixed solvent. In feeding the mixed solvent, the mixing ratio between both solvents in the mixed solvent can be varied by controlling the feed of each of the solvents from the above-mentioned first solvent feeder 2 and high pressure second solvent feeder 3 and thus can be controlled so that the mixing percentage of the second solvent may be gradually increased.

Thus, this apparatus for producing porous materials is configured so that the wet material may be dried while varying the feed ratio between the first solvent and second solvent by controlling the feed of each of the solvents from the first solvent feeder 2 and high pressure second solvent feeder 3 in the feed ratio controlling section and thereby varying the mixing ratio between both solvents in the mixed solvent. In controlling the feed of each of the solvents from the first solvent feeder 2 and high pressure second solvent feeder 3, the feed ratio controlling section is preferably provided with the so-called feedback control system or the like so that the solvents to be fed respectively from the first solvent feeder 2 and high pressure second solvent feeder 3 may be fed at exact feed levels. For example, the first solvent feeder 2 and high pressure second solvent feeder 3 each preferably contains a built-in flowmeter or the like in the vicinity of the opening for supplying each solvent. Moreover, it is preferable that the first solvent feeder 2 and high pressure second solvent feeder 3 feed the respective solvents, as set beforehand, under the control in the feed ratio controlling section based on the detected values output from the flowmeters or the like and on the feeds set beforehand according to the feeding process. However, the feed ratio controlling system is not limited thereto but it is only necessary that it be configured so that the mixing ratio between the solvents in the mixed solvent may be varied.

The mixed solvent fed to the porous material treatment section 1 is sent to the decompression section 9 and then to the heating section 8b. Further, the first solvent separation section 5 is provided according to need. In this case, the mixed solvent is further sent to the first solvent separation section 5 and separated into the first solvent and second solvent. The mixed solvent is fed while increasing the percentage of the second solvent in the mixed solvent, namely decreasing the percentage of the first solvent. Then, the feeding of the first solvent is discontinued and the second solvent alone is fed. Soon, the mixing percentage of the first solvent in the mixed solvent reaches almost zero. Thereafter, the feeding of the second solvent is still continued. Thereby, the wet material in the porous material treatment section 1 is dried while undergoing solvent replacement and, after completion of the solvent replacement, the drying is continued solely by the mixed solvent in which the mixing percentage of the first solvent is almost zero, namely almost by the second solvent alone. Finally, the feeding of the second solvent is discontinued, the inside of the porous material treatment section 1 is decompressed, and the dried porous material derived from the originally wet material is taken out of the porous material treatment section 1.

In this apparatus, a first solvent reservoir 10a is also provided according to need, and this first solvent reservoir 10a is configured so that a part or the whole of the first solvent separated in the first solvent separation section 5 may be stored therein. And, the first solvent stored therein is circulated for reuse to the high pressure first solvent feeder 2.

Under certain separation conditions in the first solvent separation section 5, the second solvent, which essentially should not be contained, is sometimes found abundantly in the first solvent separated in that section. Therefore, the first solvent reservoir 10a may be provided with an additional function to heat the solvent, for instance, so that the second solvent dissolved in the first solvent may be removed.

Figure 2:
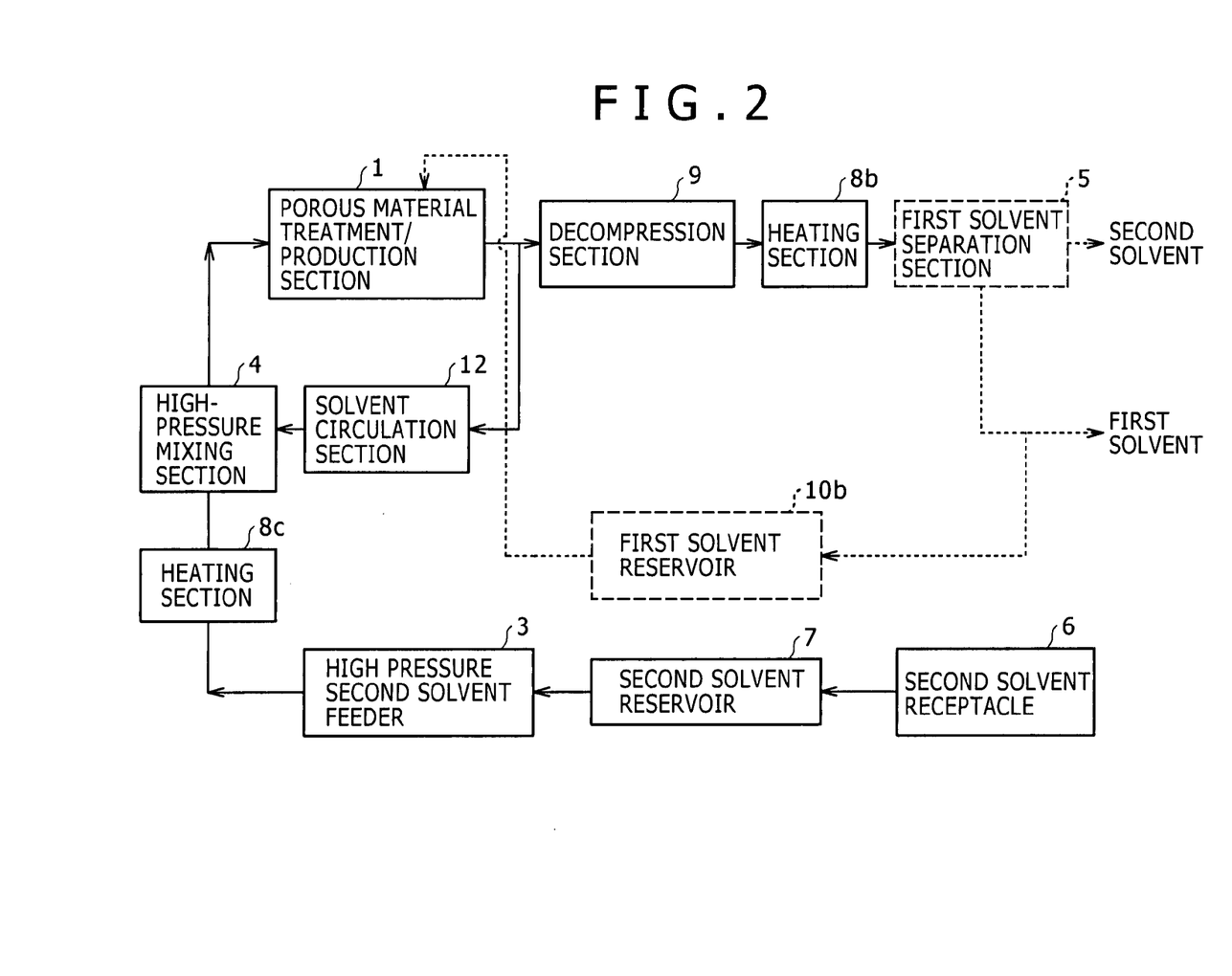
FIG. 2 is an explanatory drawing illustrating, by way of example, another configuration of the production apparatus according to the present invention.

FIG. 2 is a schematic explanatory drawing illustrating another example of the configuration of the production apparatus according to the present invention. The fundamental configuration of this apparatus is similar to the apparatus configuration shown in FIG. 1 and described above, and the same reference numerals are given to the corresponding sections and so forth to thereby avoid repeated description.

This apparatus is configured so that the first solvent contained in the wet material may be circulated and utilized as a part of the mixed solvent by providing the solvent circulation section 12 in lieu of the high pressure first solvent feeder 2 in the apparatus shown in FIG. 1. In this apparatus, the wet material containing the first solvent is placed in the porous material treatment section 1. The same solvent as the solvent contained in this wet material is in advance put in circulation from the high pressure mixing section 4 to the porous material treatment section 1 by sending the same to the solvent circulation section 12. This solvent circulation is carried out while the solvent remains in a high pressure condition. And, the second solvent from the second solvent feeder 3 is fed to the high pressure mixing section 4 via the heating section 8c and, in the high pressure mixing section 4, the first solvent and second solvent are mixed up at a predetermined mixing ratio to give the mixed solvent, which is sent to the porous material treatment section 1, where the same treatment as mentioned above is carried out. On that occasion, by providing a second solvent feed controlling system (not shown), it becomes possible to vary the feed of the second solvent from the high pressure second solvent feeder 3 by means of the second solvent feed controlling system to thereby vary the mixing percentage of the second solvent in the mixed solvent fed from the high pressure mixing section 4 to the porous material treatment section 1. The second feed controller may be disposed on the inlet side of the high pressure mixing section 4 or on the inlet side or outlet side of the high pressure second solvent feeder 3. It is not necessary, however, to dispose the second solvent feed controlling system at one of those locations. It is only necessary that it be located at a site making it possible to vary the mixing percentage of the second solvent in the mixed solvent. In varying the mixing percentage of the second solvent in the mixed solvent, it is also possible to provide a circulating solvent controlling system (not shown) for controlling the amount of the solvent discharged from the porous material treatment section in lieu of or in combination with the second solvent feed controlling system.

In this apparatus, too, the first solvent separation section 5 or first solvent reservoir 10b may be provided according to need. In the first solvent reservoir 10b, a part or the whole of the first solvent separated in the first solvent separation section 5 can be stored. And, the first solvent stored therein is circulated for reuse to the porous material treatment section 1. Here, the feeding of the first solvent to the porous material treatment section 1 is carried out only when the porous material treatment section 1 is at ordinary pressure.

The other elements of the configuration are basically the same as those in the apparatus shown in FIG. 1, and it is also possible to carry out the process of the present invention effectively using such an apparatus configuration.

Figure 3:
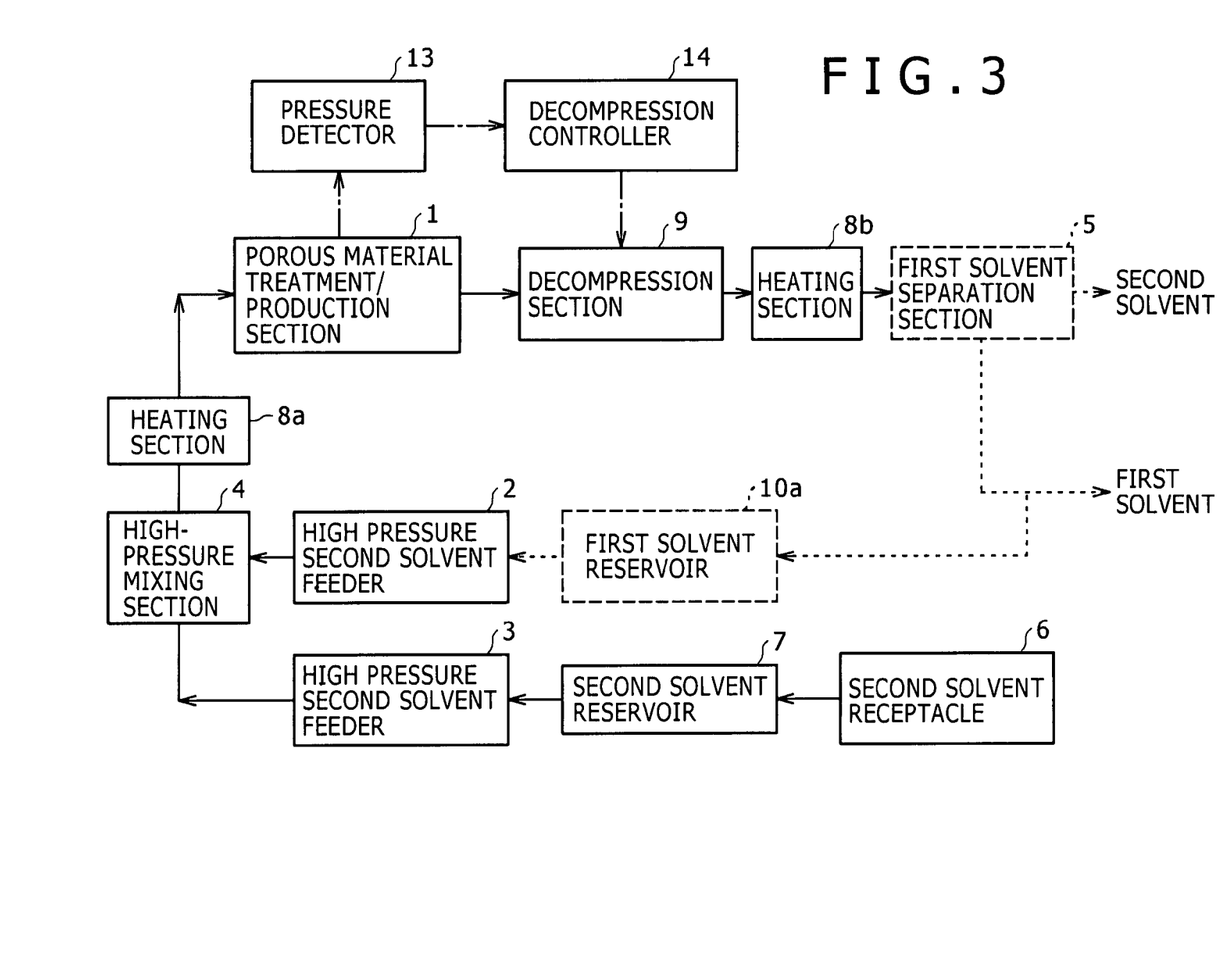
FIG. 3 is an explanatory drawing illustrating, by way of example, another configuration of the production apparatus according to the present invention.

FIG. 3 is a schematic explanatory drawing illustrating another example of the configuration of the production apparatus according to the present invention. The fundamental configuration of this apparatus is similar to the apparatus configuration shown in FIG. 1 and described above, and the same reference numerals are given to the corresponding sections and so forth to thereby avoid repeated description.

This apparatus is provided, in the porous material treatment section 1, with a pressure detector 13 for detecting the pressure of the mixed solvent in a high pressure condition as fed to the porous material treatment section 1, in addition to the configuration of the apparatus shown in FIG. 1. And, the decompression section 9 is controlled by the decompression controller 14 based on the signal detected by the pressure detector 13 so that the pressure of the mixed solvent may decrease with the lapse of time during feeding. The term "decrease" as used herein refers not only to the case of the pressure of the mixed solvent decreasing continuously and smoothly but also to the case of that pressure decreasing stepwise. In FIG. 3, the pressure detector 13 is so configured that it detects the pressure of the mixed solvent in the porous material treatment section 1. It is also possible, however, to detect the pressure of the mixed solvent prior to introduction of the mixed solvent into the porous material treatment section 1.

Figure 4:
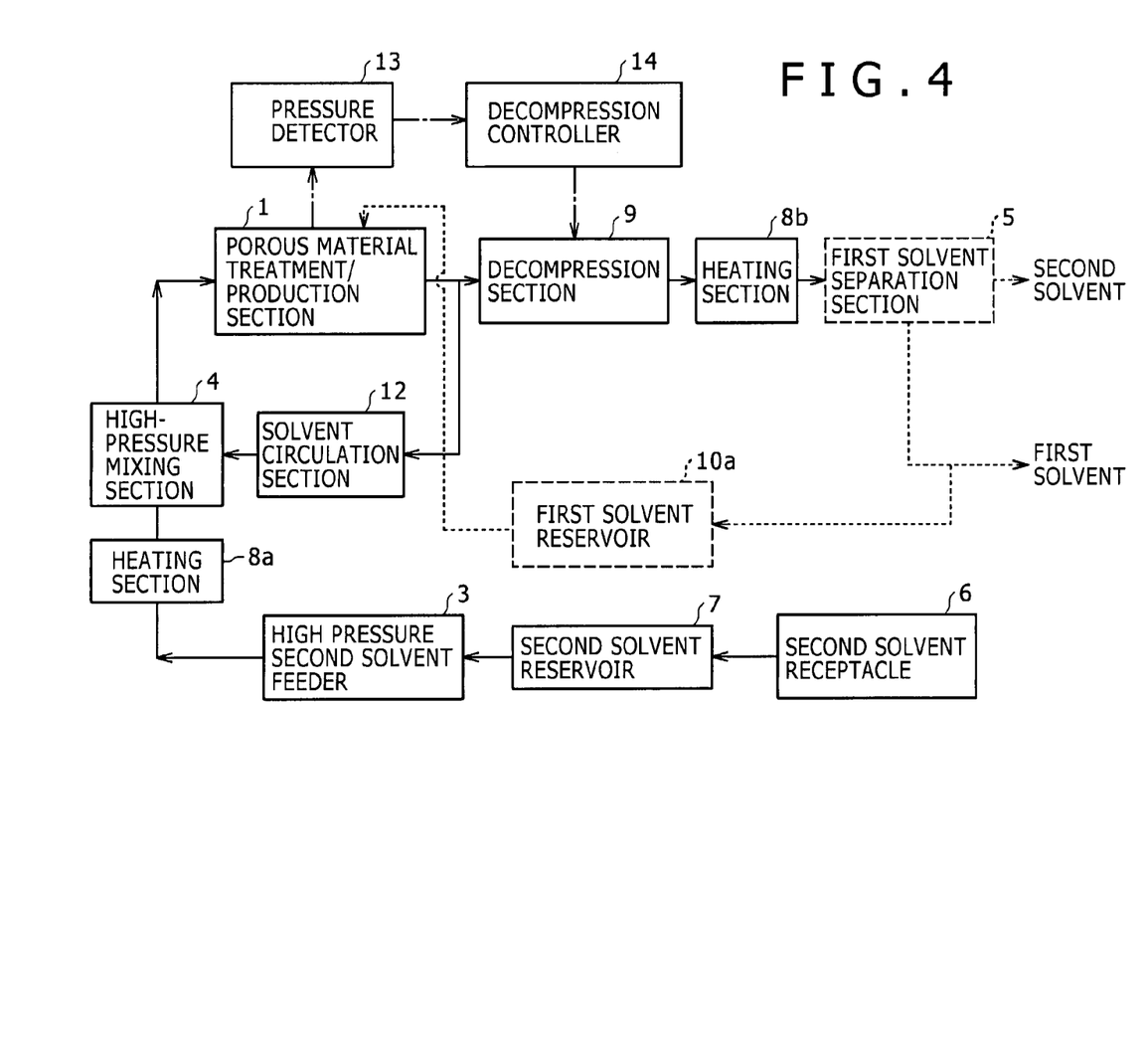
FIG. 4 is an explanatory drawing illustrating, by way of example, a further configuration of the production apparatus according to the present invention.

FIG. 4 is a schematic explanatory drawing illustrating another example of the configuration of the production apparatus according to the present invention. The fundamental configuration of this apparatus is similar to the apparatus configuration shown in FIG. 2 and described above, and the same reference numerals are given to the corresponding sections and so forth to thereby avoid repeated description.

This apparatus is provided, in the porous material treatment section 1, with a pressure detector 13 for detecting the pressure of the mixed solvent in a high pressure condition as fed to the porous material treatment section 1, in addition to the configuration of the apparatus shown in FIG. 2. And, the decompression section 9 is controlled by the decompression controller 14 based on the signal detected by the pressure detector 13 so that the pressure of the mixed solvent may decrease with the lapse of time during feeding. The term "decrease" as used herein has the same meaning as given above referring the apparatus shown in FIG. 3. In FIG. 4, the pressure detector 13 is so configured that it detects the pressure of the mixed solvent in the porous material treatment section 1. It is also possible, however, to detect the pressure of the mixed solvent prior to introduction of the mixed solvent into the porous material treatment section 1.

The following examples illustrate the present invention in further detail. The following examples are, however, by no means limitative of the scope of the invention in nature. It should be noted that all design changes made in view of the purport of the foregoing description and succeeding description fall within the technical scope of the invention.

EXAMPLES

For obtaining a silica aerogel, tetramethoxysilane was used as an alkoxysilane and ethanol as a solvent, and a catalyst and aqueous ammonia as water for hydrolysis were added to and mixed with them to thereby cause hydrolysis of the alkoxysilane, followed by polycondensation, to give a gel-like compound. Isopropanol was added to this gel-like compound and, after heat treatment (so-called maturation step), a material resulting from complete displacement of the solvent portion (this material is referred to as "alcogel") was obtained.

The thus-obtained alcogel (wet gel) was used and dried by each of the methods shown under (A) to (C) below under different atmospheric conditions, and the state of aerogel formation on each occasion was studied. On such an occasion of drying, a high pressure vessel equipped with a glass window was used and the drying was carried out while observing the vessel inside.

(A) Process Comprising Feeding Supercritical Carbon Dioxide into the High Pressure Vessel The high pressure vessel was filled with isopropanol, one sheet of the above-mentioned alcogel was placed therein, and the vessel was closed with a lid. The high pressure vessel was heated to 60° C. (A in FIG. 5) and pressurized to 13 MPa (B in FIG. 5) with carbon dioxide and, then, supercritical carbon dioxide at 60° C. and 13 MPa was continuously fed thereto to thereby replace the isopropanol (IPA) in the high pressure vessel with carbon dioxide (from B to C in FIG. 5). Thereafter, the high pressure vessel inside was decompressed (from C to D in FIG. 5), and the gel was taken out of the vessel.

As a result, it could be confirmed that when the whole treatment process was finished in 7 hours, a distinct interface was formed between the isopropanol and supercritical carbon dioxide in the step of isopropanol displacement within the high pressure vessel with supercritical carbon dioxide and, as a result, cracks were caused in the gel. It could also be confirmed that no cracks were caused in the gel when the feeding of supercritical carbon dioxide was temporarily discontinued or the supercritical carbon dioxide was fed very slowly so that no two-phase interface might be formed as a result of mutual diffusion of the isopropanol and carbon dioxide. In that case, however, a period as long as 9 hours was required to complete the whole treatment process. When a spacer within the vessel was removed to make the vessel 1.6 times deeper and two alcogel sheets were placed in the vessel and dried. When, in the replacement step, supercritical carbon dioxide at 60° C. and 13 MPa was passed through the vessel at a flow rate of 10 cc/min, in the same manner as described above, it was necessary, for avoiding cracking of the gel, to continuously feed such carbon dioxide for 770 minutes, and a period as long as about 14 hours was required to complete the whole treatment process.

(B) Process Comprising Feeding a Mixed Solvent Composed of Supercritical Carbon Dioxide and Isopropanol to a High Pressure Vessel The apparatus shown in FIG. 1 was used. The high pressure vessel (corresponding to the porous material treatment section 1) was filled with isopropanol, the above-mentioned alcogel was placed therein, and the high pressure vessel was closed with a lid, heated to 60° C. and then pressurized to 13 MPa with carbon dioxide. Thereafter, a mixed solvent composed of supercritical carbon dioxide and isopropanol was fed at 60° C. and 13 MPa. On that occasion, isopropanol and carbon dioxide were mixed up in a manner such that the mass percentage of isopropanol in the mixed solvent decreased with the lapse of time during feeding (e.g. 95% by mass→90% by mass→85% by mass ... ), and the resulting mixture was fed to the high pressure vessel. In such a manner of feeding, the isopropanol concentration within the high pressure vessel also decreased as the mass percentage of isopropanol in the mixed solvent decreased.

After arrival of the isopropanol percentage in the mixed fluid to be fed at 0%, supercritical carbon dioxide alone was fed for a while and, after arrival of the isopropanol concentration within the high pressure vessel at 0.5% or below, decompression was carried out.

When such a process was employed, no interface was formed even after the treatment time (7 hours) which caused cracking of the gel in the above-mentioned case (A), and no cracks were caused in the gel in the step of drying.

(C) Process Comprising Circulating the Solvent Discharged from a High Pressure Vessel and Mixing the Same Gradually with Supercritical Carbon Dioxide The apparatus shown in FIG. 4 was used. The high pressure vessel (corresponding to the porous material treatment section 1) was filled with isopropanol, the above-mentioned alcogel was placed therein, and the high pressure vessel was closed with a lid, heated to 60° C. and then pressurized to 13 MPa with carbon dioxide, and the solvent discharged from the high pressure vessel was circulated by feeding the same to the high pressure vessel via the high pressure mixing section 4 by means of a circulating pump (solvent circulation section 12). Thereafter, while continuously circulating this solvent, supercritical carbon dioxide at 60° C. and 13 MPa was continuously fed at 10 cc/min via the high pressure mixing section 4. On that occasion, the decompression section 9 was controlled by the decompression controller 14 based on the signal from the pressure detector 13 so that a part of the mixed solvent might be discharged out of the system via the first solvent separation section 5 while maintaining the high pressure vessel inside pressure at 13 MPa. As a result, the isopropanol concentration within the high pressure vessel decreased gradually (with the lapse of time during supercritical carbon dioxide feeding) and, finally, supercritical carbon dioxide alone was found in the high pressure vessel. Thereafter, supercritical carbon dioxide was fed for a while and, after arrival of the isopropanol concentration within the high pressure vessel at 0.5% or below, decompression was carried out.

When such a process was employed, too, no interface was formed even after the treatment time (7 hours) which caused cracking of the gel in the above-mentioned case (A), and no cracks were caused in the gel in the step of drying. Thus, in the above-mentioned case (A), it is necessary to carry out the treatment under conditions such that no two-phase interface may be formed depending on the mutual diffusion rates of the solvents and, for that purpose, a long period of treatment becomes necessary. On the contrary, in the cases [(B), (C)] according to the present invention, the concentration of the mixed solvent around the gel can be freely controlled, so that uniform treatment in a short period of time can be made possible by freely setting the flow rate around a large-sized gel or a plurality of gel pieces, without restricting the flow rate of the mixed solvent.

(D) Another Process Comprising Circulating the Solvent Discharged from a High Pressure Vessel and Gradually Mixing the Same with Supercritical Carbon Dioxide The apparatus shown in FIG. 2 was used. The high pressure vessel (corresponding to the porous material treatment section 1) was filled with isopropanol, the above-mentioned alcogel was placed therein, and the high pressure vessel was closed with a lid, heated to 60° C. and then pressurized to 13 MPa with carbon dioxide, and the solvent discharged from the high pressure vessel was circulated by feeding the same to the high pressure vessel via the high pressure mixing section 4 by means of a circulating pump (solvent circulation section 12). Thereafter, while continuously circulating this solvent, supercritical carbon dioxide was continuously fed at 60° C. and 13 MPa via the high pressure mixing section 4. On that occasion, however, the initial feed of supercritical carbon dioxide was 20 cc/min and, after the lapse of 180 minutes from the start of feeding of supercritical carbon dioxide, the feed of supercritical carbon dioxide was increased to 35 cc/min. Thus, in gradually increasing the mixing percentage of the second solvent supercritical carbon dioxide, the very rate of increase in the mixing percentage of supercritical carbon dioxide was increased step wise (gradually) by means of the second solvent feed controlling system. As a result, after 100 minutes from the time of arrival of the feed of supercritical carbon dioxide at 35 cc/min, the isopropanol concentration within the high pressure vessel was 0.5% or below. After arrival of the isopropanol concentration at 0.5% or below, decompression was carried out over further 30 minutes. As a result, the time required for the whole treatment process was about 5.7 hours.

It is possible also by such a process (invention [D]) to efficiently produce porous materials while preventing cracks of the like from being caused in the porous materials. By operating in that manner while stepwise (gradually) increasing the very rate of the increase in mixing percentage of supercritical carbon dioxide, it becomes possible to further shorten the treatment time.

(E) Another Process Comprising Circulating the Solvent Discharged from the High Pressure vessel and Gradually Mixing the Same with Supercritical Carbon Dioxide The apparatus shown in FIG. 2 was used. The high pressure vessel (corresponding to the porous material treatment section 1) was filled with isopropanol, the above-mentioned alcogel was placed therein, and the high pressure vessel was closed with a lid, heated to 60° C. and then pressurized to 13 MPa with carbon dioxide, and the solvent discharged from the high pressure vessel was circulated by feeding the same to the high pressure vessel via the high pressure mixing section 4 by means of a circulating pump (solvent circulation section 12). Thereafter, while continuously circulating this solvent, supercritical carbon dioxide was continuously fed at 60° C. via the high pressure mixing section 4. On that occasion, however, the initial pressure of the mixed solvent (initially isopropanol alone) was 13 MPa and, after 40 minutes from the start of feeding of supercritical carbon dioxide, the pressure was reduced to 11.5 MPa and, after 80 minutes, to 10 MPa, in the decompression section 9. Thus, the pressure of the mixed solvent was gradually reduced (with the lapse of time during supercritical carbon dioxide feeding). As a result, the isopropanol concentration within the high pressure vessel after the lapse of 300 minutes amounted to 0.5% or below. As a result, the time required for the whole treatment process was 6 hours.

It is possible also by such a process (invention [E]) to efficiently produce porous materials while preventing cracks or the like from being caused in the porous materials. By gradually reducing the pressure of the mixed solvent in such a manner, it becomes possible to further shorten the treatment time as compared with the above-mentioned process (C).

(F) Another Process Comprising Circulating the Solvent Discharged from the High Pressure Vessel and Gradually Mixing the Same with Supercritical Carbon Dioxide The apparatus shown in FIG. 4 was used. The high pressure vessel (corresponding to the porous material treatment section 1) was filled with isopropanol, a sheet of the above-mentioned alcogel was placed therein, and the high pressure vessel was closed with a lid, heated to 60° C. and then pressurized to 13 MPa with carbon dioxide over 30 minutes and, thereafter, the solvent discharged from the high pressure vessel was circulated to the high pressure vessel via the high pressure mixing section 4 by means of a circulating pump (solvent circulation section 12) while supercritical carbon dioxide was continuously fed at a rate of 20 cc/min via the high pressure mixing section 4. On that occasion, the decompression section 9 was controlled by the decompression controller 14 based on the signal from the pressure detector 13 so that a part of the mixed solvent discharged from the high pressure vessel might be discharged out of the system via the first solvent separation section 5 while maintaining the high pressure vessel inside pressure at 13 MPa. As a result, the isopropanol concentration within the high pressure vessel decreased gradually (with the lapse of time during supercritical carbon dioxide feeding), and the isopropanol concentration measured after 360 minutes was 0.5% or below, so that decompression was then carried out over 30 minutes. The time required for the whole treatment process was about 7 hours.

(G) Further Process Comprising Circulating the Solvent Discharged from the High Pressure Vessel and Gradually Mixing the Same with Supercritical Carbon Dioxide The procedure of the above-mentioned (F) was followed almost in the same manner except that the spacer within the vessel was removed to make the vessel 1.6 times deeper, two sheets of the alcogel were placed in the vessel, and the rate of feeding of supercritical carbon dioxide was 32 cc/min. As a result, the time required for the whole treatment process was about 7 hours, like in the case of (F).

When such a processes (invention [(F), (G)] were employed, too, no interface was formed even after the treatment time (7 hours) which caused cracking of the gel in the above-mentioned case (A), and no cracks were caused in the gel in the step of drying. Further, even when the number of alcogel sheets is increased, as from the above-mentioned case (F) to the above-mentioned case (G), the rate of concentration change in the vessel can be freely set, so that the treatment can be finished in a short period of time, like in the case of treatment of a single sheet, and efficient commercial production of porous materials is thus possible.

When, in the processes comprising feeding a replacing solvent alone, as in the prior art, the rate of replacement is restricted, the treatment time is prolonged as the size of the treatment vessel increases. According to the present invention, however, a mixed solvent resulting from admixture of the same solvent as the solvent contained in the wet material or a solvent of the same kind as such a solvent with a replacing solvent is fed, so that the replacement with the replacing solvent can be realized by uniformly and continuously varying the concentration of that solvent in the whole treatment vessel. As a result, even when the size of the treatment vessel is increased, the treatment time is not prolonged but it becomes possible to produce porous materials efficiently.

Further, when, in increasing the mixing percentage of the second solvent with the lapse of time during feeding thereof, the very rate of increase in the mixing percentage of the second solvent is increased, the rate of replacement in the initial period of replacement, which influences the crack formation, can be suppressed and the rate of replacement in the later period of replacement can be increased. As a result, the treatment time can be reduced and, thus, it becomes possible to produce porous materials efficiently.

Further, when the pressure of the mixed solvent is lowered with the lapse of time during feeding thereof, the density of the replacing solvent lowers and the concentration ratio between the solvent contained in the wet material and the replacing solvent relatively decreases, so that the rate of replacement is improved and, thus, efficient porous material production becomes possible.

INDUSTRIAL APPLICABILITY

The present invention, which has the configuration described hereinabove, has made it possible to efficiently produce porous materials while preventing cracking, porous material destruction and the like in the step of drying.

The invention claimed is:
1. A process for producing an aerogel, comprising:
 (a) placing a wet gel comprising a first solvent into a porous material treatment section of an apparatus,
  wherein the first solvent is alcohol, water, or a mixture thereof;
 (b) feeding both a supercritical second solvent and a third solvent to a high-pressure mixing section of said apparatus,
  wherein said supercritical second solvent is selected from the group consisting of carbon dioxide, nitrous oxide, propane, and ammonia; and,
  wherein said third solvent is composed of the same solvent as the first solvent;
 (c) mixing the third solvent and the supercritical second solvent in said high-pressure mixing section of said apparatus to form a mixed solvent;
 (d) discharging the mixed solvent from said high-pressure mixing section of said apparatus and
 feeding the mixed solvent into the porous material treatment section of said apparatus, thereby feeding the mixed solvent into the wet material, such that at least some of the first solvent in the wet gel is removed and replaced with at least some of the mixed solvent,
 (e) discharging the resulting solvent from said high-pressure mixing section of said apparatus,
  wherein said resulting solvent is a mixture of the first solvent, which has been extracted from the wet gel, and the mixed solvent; and,
 (f) continuously recirculating said resulting solvent into said high-pressure mixing section of said apparatus; and,
 (g) adding additional supercritical second solvent to said high-pressure mixing section so that the additional supercritical second solvent increases the concentration of supercritical second solvent in the continuously recirculating resulting solvent, so the mixing percentage of the second solvent continuously increases with the lapse of time during feeding.

2. The process of claim 1, wherein a rate of increase in the mixing percentage of said second solvent in the mixed solvent is increased with lapse of time during the feeding.

3. The process of claim 1, wherein, a pressure of the mixed solvent is reduced with lapse of time during the feeding.

4. The process of claim 1, wherein said first solvent is an alcohol and said second solvent is carbon dioxide.

5. The process of claim 1, wherein the second solvent is selected from the group consisting of carbon dioxide, nitrous oxide, propane and ammonia.

6. The process of claim 1, wherein the second solvent is nitrous oxide.

7. The process of claim 1, wherein the second solvent is carbon dioxide.

8. The process of claim 1, further comprising heating the porous material treatment section of the apparatus.

9. The process of claim 8, wherein the feeding is conducted at 13 MPa and 60° C.

10. The process of claim 9,
 wherein the first solvent is isopropanol,
 wherein the second solvent is carbon dioxide in a supercritical state, and
 wherein the third solvent is isopropanol.

11. The process of claim 1, further comprising, after the feeding, drying the material.

12. The process of claim 1, wherein the second solvent is ammonia.

13. The process of claim 1, wherein the second solvent is propane.

14. The process of claim 1, wherein in the mixed solvent, the second solvent is in a supercritical state, and the third solvent is not in a supercritical state.

\* \* \* \* \*